United States Patent

Einsle et al.

[11] Patent Number: 6,070,316
[45] Date of Patent: Jun. 6, 2000

[54] METHOD AND DEVICE FOR MOUNTING AN OPTICAL CABLE ON AN OVERHEAD LINE

[75] Inventors: Günter Einsle, München; Dieter Kreutz, Grünwald, both of Germany

[73] Assignee: Siemens Aktiengesellschaft, Munich, Germany

[21] Appl. No.: 09/155,935

[22] PCT Filed: Apr. 11, 1997

[86] PCT No.: PCT/DE97/00743

§ 371 Date: Oct. 8, 1998

§ 102(e) Date: Oct. 8, 1998

[87] PCT Pub. No.: WO97/39373

PCT Pub. Date: Oct. 23, 1997

[30] Foreign Application Priority Data

Apr. 12, 1996 [DE] Germany ............................ 196 14 510
Feb. 24, 1997 [DE] Germany ............................ 197 07 262

[51] Int. Cl.[7] ................................................. B23P 11/00
[52] U.S. Cl. ............................ 29/431; 29/525.01; 29/819; 414/918; 174/45 R
[58] Field of Search ....................... 29/430, 433, 525.01, 29/525.03, 525.08, 525.09, 819, 431; 414/918; 174/45 R; 248/58, 61

[56] References Cited

FOREIGN PATENT DOCUMENTS 0 491 514   6/1992   European Pat. Off. .
32 28 239   2/1984   Germany .
44 00 619   7/1994   Germany .

OTHER PUBLICATIONS

C. N. Carter et al, The Development of Wrap–On Optical Cables for Use on the Earthwires of High Voltage Power Lines, *International Conference on Large High Voltage Electric Systems*, 1988, pp. 1–6.

Abstract for Japanese 60162203, *Patents Abstracts of Japan.*

Abstract for Japanese 02156207, *Patent Abstracts of Japan.*

*Primary Examiner*—David P. Bryant
*Attorney, Agent, or Firm*—Hill & Simpson

[57] ABSTRACT

In order to fit an optical cable to a cable of an overhead line, a lashing apparatus is provided which runs along the cable of the overhead line. A pylon bypass for the lashing apparatus of the optical cable is fitted to a line pylon and is designed such that the lashing apparatus is diverted from the respective cable in the region of the pylon and is passed around the pylon by the pylon bypass.

20 Claims, 11 Drawing Sheets

METHOD AND DEVICE FOR MOUNTING AN OPTICAL CABLE ON AN OVERHEAD LINE

BACKGROUND OF THE INVENTION

The invention relates to a method for fitting an optical cable to a cable of an overhead line having a sequence of line pylons, a lashing apparatus being provided which runs along the cable of the overhead line.

A framework which can be fitted to a pylon and has two cantilever arms was disclosed in an article by Carter et al, "The Development of Wrap-on Optical Cables for Use on the Earthwires of High Voltage Power Lines", *International Conference on Large High Voltage Electric Systems*, 1988, pages 1–6. As is evident in particular from FIG. 7 of the article, the lashing machine is raised off the high-tension overhead line cable by means of a rope or cable and is pivoted around above the pylon by means of the vertical framework, which can rotate. The lashing machine is then placed on the high-tension overhead line cable once again on the other side of the pylon. Such bypassing is complicated and involves an appropriately strong framework and cantilever arms.

FIG. 5 of DE-A1 32 28 239 discloses a lashing apparatus for an optical cable, which is moved along a line cable of an overhead line. When this lashing apparatus arrives at an overhead line pylon, the supply coil is removed from the lashing apparatus and is passed around behind the pylon to a second lashing apparatus. However, passing the cable drum or the entire lashing apparatus around the pylon is highly time-consuming and requires appropriate transport devices (for example lifting platforms, mounting brackets or the like) by means of which the action of passing the apparatus around the pylon, can be carried out.

SUMMARY OF THE INVENTION

The invention is based on the object of indicating a way in which a lashing apparatus can be transferred from one side of the pylon to the other in an easier manner.

According to the invention, this object is achieved in the case of a method of the type mentioned initially in that two ends of the pylon bypass, which is formed in the shape of an arc, are fitted to the respective cable, in that the lashing apparatus is diverted from the respective cable in the region of the pylon and is passed around said pylon, by means of the pylon bypass, in the shape of an arc.

The pylon bypass, which is designed in the shape of an arc, is considerably lighter than the overall lashing apparatus or even a cable drum, and it can be handled more easily, can be fitted and removed more easily, and allows the lashing apparatus to be passed on particularly safely and reliably from one side of the pylon to the other.

The invention also relates to a device for bypassing a lashing apparatus for an optical cable, which apparatus is passed along a cable of an overhead line and which is characterized in that a pylon bypass which is formed in the shape of an arc is provided in such a manner that one of its ends rests on the incoming cable, and its other end rests on the outgoing cable, and in that the pylon bypass has a guide for passing on the lashing apparatus.

DESCRIPTION OF THE PREFERRED EMBODIMENTS

Figure 1:
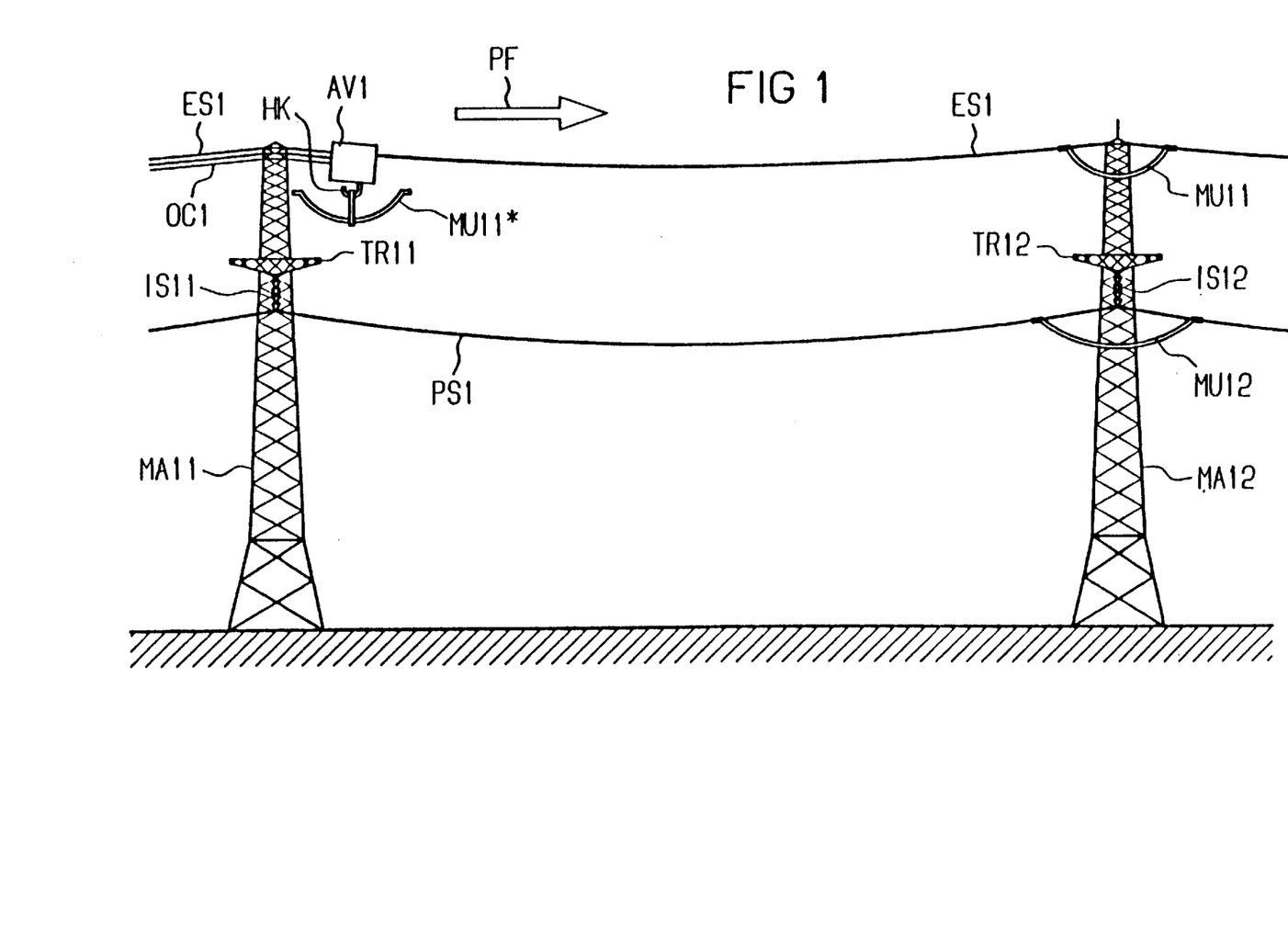
FIG. 1 is a schematic illustration of an overhead line with a lashing apparatus and a schematically illustrated pylon bypass according to the invention.

FIG. 1 shows two pylons MA11 and MA12 of an overhead line, in particular of a high-tension overhead line. This overhead line has a ground cable ES1 (fitted at the top of the pylons) as well as phase cables PS1 which are fastened, for example, to cross arms TR11 and TR12 in the normal manner, by insulators IS11, IS12. In the present example, it is assumed that the intention is to lash an optical cable OC to the ground cable ES, to be precise in the direction of the arrow PF, from left to right. A lashing apparatus AV1 is provided for this purpose and fastens the optical cable OC1 to the ground cable ES1 in a suitable manner. The normal types of fastening comprise, for example, the fitting of individual retaining lugs, the fitting of continuous retaining wires, the fitting of adhesive tapes and, possibly, looping the optical cable OC around the ground cable ES in a helical arrangement. All the known lashing methods can thus be used. It is possible to fit the optical cable OC1 in an appropriate supply drum on the lashing apparatus AV1 itself, and likewise to provide the corresponding elements, in the form of tapes or wires, for the lashing process there as well. Alternatively, as is known per se, it is possible to keep the optical cable OC1 on a supply coil on the ground and to raise it up to the lashing apparatus AV1, after which the lashing apparatus AV1 then carries out the actual lashing process to the respective cable.

Once the lashing apparatus AV1 has passed over the span length between the pylons MA11 and MA12, then a difficulty arises since the lashing apparatus AV1 reaches the pylon MA12, at which point it can no longer run along the ground cable ES1. Passing the lashing apparatus around from one subsection of the line cable to the subsection which continues on the other side of the pylon is achieved by means of a pylon bypass MU11, which is indicated only schematically here and which bridges the respectively reached pylon (in the present example the pylon MA12) such that the respective lashing apparatus AV1 can be moved past the pylon MA12. The pylon bypass MU11 is in this case fastened in a mechanically advantageous manner to the respective pylon MA2, for example by means of an appropriate linkage or the like, and it is designed to be intrinsically sufficiently strong to allow it to bear the lashing apparatus AV1. The pylon bypass MU11 is preferably formed roughly in the shape of an arc with its two ends being connected in an appropriate manner to the respective cable ES to be bridged, so that the lashing apparatus AV1 can leave the respective cable ES1 in a similar manner to that in the case of a bypass switch, is passed around the pylon MA2 in the form of an arc and then, after leaving the pylon bypass MU11, continues to move on the cable ES1 again in the known manner.

Owing to the simplicity as well as the relatively low weight of the pylon bypass MU11, it is possible to fit the optical cable to the earth cable of the overhead line even when live phase cables PS1 of the latter have not been switched off. If, on the other hand, the optical cable OC is fitted to switched off phase cables PS1, then a pylon bypass MU12 must be provided which is mechanically fastened to the pylon MA12 and/or to its cross arm TR12, so that the associated lashing apparatus can be moved around the respective suspension insulators IS11 or IS12 of the phase cable or cables PS1.

The pylon bypass MU11 can be transported on from pylon to pylon, for example by means of a mobile cantilever crane or a lifting platform. Alternatively, it is possible to carry the pylon bypass along the respective cable, either on its own suspended, for example, from its own roller or else in combination with the lashing apparatus AV1. The pylon bypass MU11* is held detachably, for example by means of a hook HK, on the lashing apparatus AV1.

Figure 2:
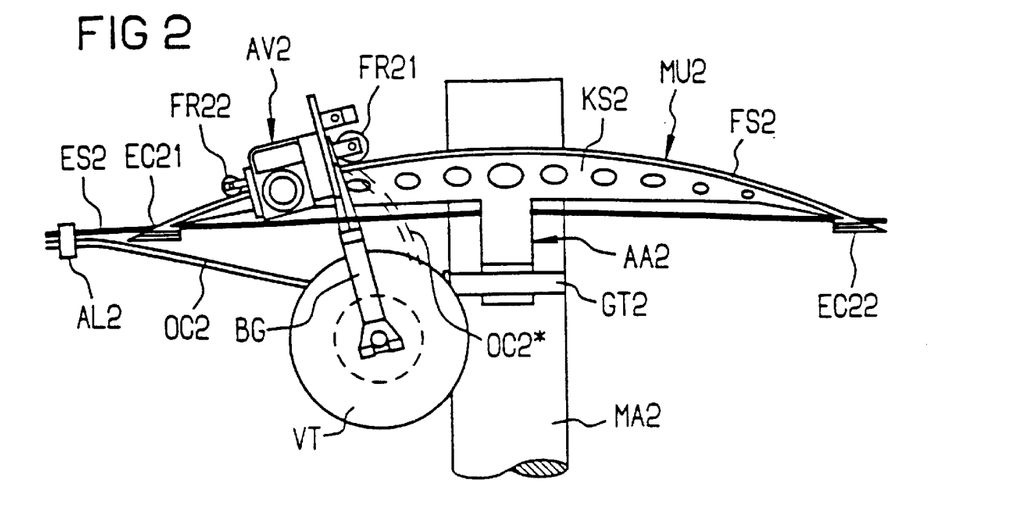
FIG. 2 is a side view of a pylon bypass according to the invention.
Figure 3:
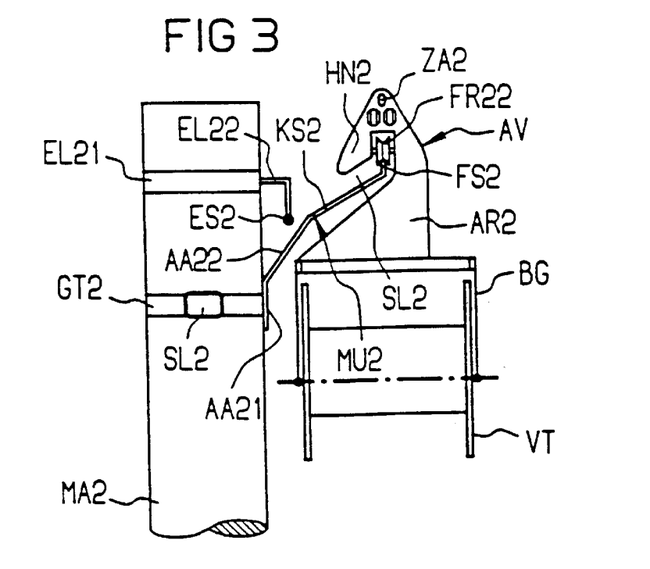
FIG. 3 is an end view of the pylon device according to FIG. 2, in a position rotated through 90°.

FIG. 2 shows a view, transversely with respect to the ground cable ES2, of a pylon bypass MU2 in detail. FIG. 3 shows the same arrangement in a position rotated through 90°, that is to say viewed in the longitudinal direction of the ground cable ES2. The pylon bypass MU2 is expediently formed in the shape of an arc which is preferably as a segment of a circle (FIG. 2). The pylon bypass MU2 has an arm AA2 which is used for support, runs in the direction of the pylon MA2, which is example made of concrete or wood and is held there by an appropriate fastening device GT2. Fastening devices which can be fitted quickly and can be removed quickly are expediently used, for example a strap combined with a turnbuckle SL2, a quick-release fastener or the like. Alternatively, it is possible to design the arm AA2 with a hook or a fixed lug in such a manner that it is held in a force-fitting or positively locking manner by being hooked in on the pylon MA2. The actual bypass part KS2, which is designed in the form of an arc, of the pylon bypass MU2 is illustrated in the present example as a perforated sheet-metal part, which is made for example, of sheet aluminum or steel). Alternatively, it is possible to construct the pylon bypass HU2 from appropriate tubular frame components as a linkage which are particularly light on the one hand, and have a high load capacity on the other. The arm AA2 and the bridging part KS2 which is used as a rail, form, when seen in plan view, a roughly T-shaped structure. The ends of the bypass or bridging part KS2, which is designed in the shape of a circular arc, are denoted by EC21 and EC22 in the present example and are used as retaining elements. These retaining elements EC21 and EC22 are designed such that they at least partially engage around the respective cable ES2, for example by means of lugs, eyes or hooks, and thus, together with the supporting arm AA2, produce a type of three-point mounting for the pylon bypass MU2. The pylon bypass MU2 is thus fixed at its center to the pylon MA2 and at both of its ends EC21 and EC22, and cannot tilt or be moved in any other way into an undesirable position. The cable ES2 runs through the retaining elements EC21 and EC22 of the pylon bypass MU2 and are hooked in or suspended, so that it is easy to divert the lashing apparatus AV2 from the respective cable ES2 onto the pylon bypass MU2.

In general, the lashing apparatus AV2 has a plurality of guide rollers, for example FR21 and FR22, by means of which it runs along the respective cable ES2. The pylon bypass MU2 is designed such that it has a guide which corresponds to the bridging part KS2, for example in the form of a guide rail FS2, on which the guide rollers FR21 and FR22 can continue to roll during the bypassing process. This is most easily done by dimensioning of the guide rail FS2 such that the guide rail has approximately the same cross section as the respective cable ES2. The present example shows the situation in which the lashing apparatus AV2 has already left the cable ES2 and has moved onto the pylon bypass MU2. A lashed attachment AL2 in the form of a bracket is illustrated schematically to the left of the pylon bypass MU2 on the ground cable ES2—alternatively, as already mentioned, other lashing methods, for example in the form of tapes, may also be used. During the lashing process, the optical cable, as is illustrated by a dashed line and is denoted by OC2*, is passed through the lashing apparatus AV2 and it is expedient to remove the optical cable OC2 from the actual lashing apparatus AV2 when carrying out a pylon bypass. In this case, the optical cable OC2 must be pulled directly off the supply drum VT and must be allowed to run freely, in a corresponding arc, around the pylon to the reattachment point at the end of the pylon bypass MU2. Where it actually bypasses the pylon MA2, the lashing apparatus AV2 is moved in an arc shape via the guide rail FS2 and passes via the retaining elements EC22 which are used as a cable lug or cramp, back to the ground cable ES2 again, and then continues the lashing process for the optical cable in the known manner. The latter must then be moved to the position OC2* again. It is expedient to provide appropriate lashing means, which are for example in the form of straps, cramps, lugs, etc., within the lashing apparatus AV2. Lashing straps made of dielectric material are preferably used, since they are light and can be fitted in a simple manner. These straps can advantageously also be provided with an adhesive coating.

As can be seen from FIG. 3, the ground cable ES2 is fastened to the pylon MA2 at the side by means of a lug EL22 and strap EL21, and the pylon bypass XU2 runs with its arm AA2 pointing obliquely upward. The arm AA2 is designed to be bent and has subelements AA21 and AA22, the lower part AA21 being used for fastening to the pylon MA2, and the upper part AA22, which is bent obliquely outward, running in a slot SL2 in the lashing apparatus AV2, and the bridging part KS2, which contains the rail FS2, being fastened to this part AA22. The slot SL2 is fitted in a retaining linkage AR2, on which the guide rollers, for example FR21, FR22 are also held. The slot SL2 is arranged in the retaining linkage AR2 such that a hook tab EN2 is formed which runs obliquely downward, thus ensuring that, if the guide rollers FR21 and FR22 jump out of the pylon bypass MU2, the entire lashing apparatus AV2 is held as before on the pylon bypass MU2 by means of the hook tab HN2 and does not crash down. A tension hook, tension anchor or tension eye ZA2 is provided at the upper end of the lashing apparatus AV2, by which means the lashing apparatus AV2 can be placed onto the respective cable ES2, and can be removed from it again, for example by means of a crane, when the fitting work is begun or is completed.

In order to make it possible, for example, not only to bridge cables ES2 running in a straight line, but also to use it, for example, for corner or direction-changing pylons, the bypass device MU2 can also be designed in a number of parts, in which case, for example, two or three subelements can be provided which are arranged overall roughly in the shape of an arc, are preferably connected to one another in a jointed manner, and together produce the bridging part KS2 in the shape of a circular arc. In this way, it is possible to bridge angles greater than or less than 180° in a simple manner. This embodiment also has the advantage that the bridging element is less bulky for example during transportation or movement of the bypass device. The arm AA2 can likewise be fastened in a jointed manner to the bridging part KS2.

Since the cables of the high-tension line do not always run horizontally, but may also be routed, for example, such that they rise or fall, it may be expedient for the retaining or supporting arm AA2 likewise to be connected to the respective pylon MA2 via an articulated joint. In this way, the retaining band or lug GT2 can still be fitted as before in the horizontal direction, while the guide arm AA2, which is lashed to it via a hinged joint, can be moved into an oblique position, for example rising from left to right.

The longitudinal extent or the bridging range of the pylon bypass may advantageously be chosen to be between 1 and 3 m. The pylon bypass itself is suspended on the cable ES2 by means of the retaining elements EC21 and EC22, for example in the form of lugs, hooks, eyes or the like, and is held taut there by its own weight and by the weight of the lashing apparatus AV2. It is expedient first of all to suspend the pylon bypass on the cable ES2 by means of the retaining elements EC21 and EC22, then to move the supporting arm AA2 in the direction of the pylon MA2, and to suspend and to close the quick-action fastener or strap GT2.

The fitting operation may also be carried out such that a plurality of such bypass aids, that is to say a plurality of pylon bypasses are provided, which are each fitted to the overhead line pylons by being split in advance with an appropriate lead, so that the lashing process can be carried out, and the pylons bypassed, progressively. That or those pylon bypass or bypasses which is or are then no longer required is/are removed again and is/are fitted on a new pylon, further in front in the lashing direction.

While actually bypassing the pylon, there is no need to fit lugs, etc., so that it is advantageous to stop the appropriate lashing apparatus during the bypassing process. Only once the subelement of the cable which continues on the other side of the pylon has been reached, is the lashing process continued again.

Figure 4:
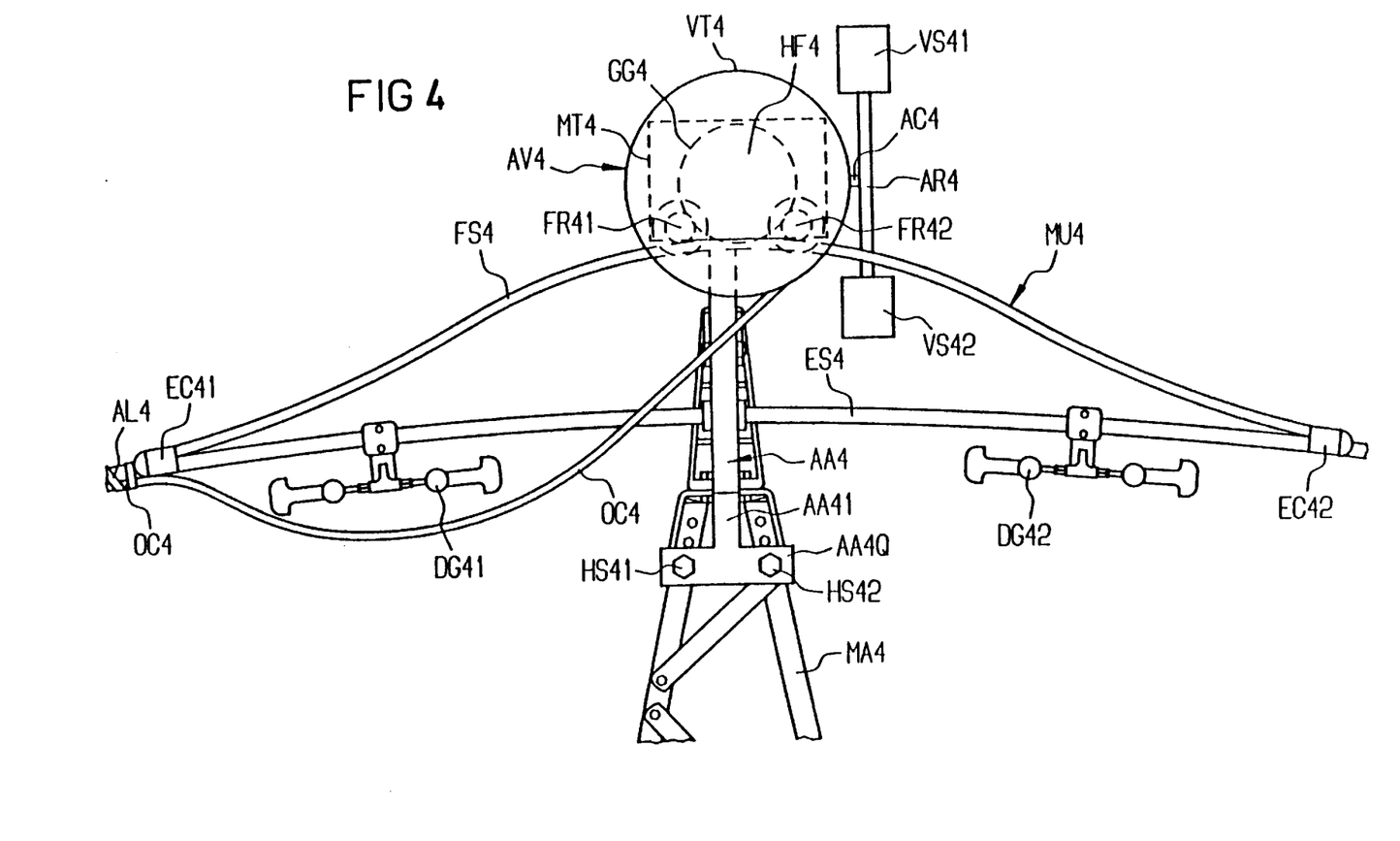
FIG. 4 is a side view of a pylon bypass, which is arranged essentially above a cable, as a further exemplary embodiment of the invention.
Figure 5:
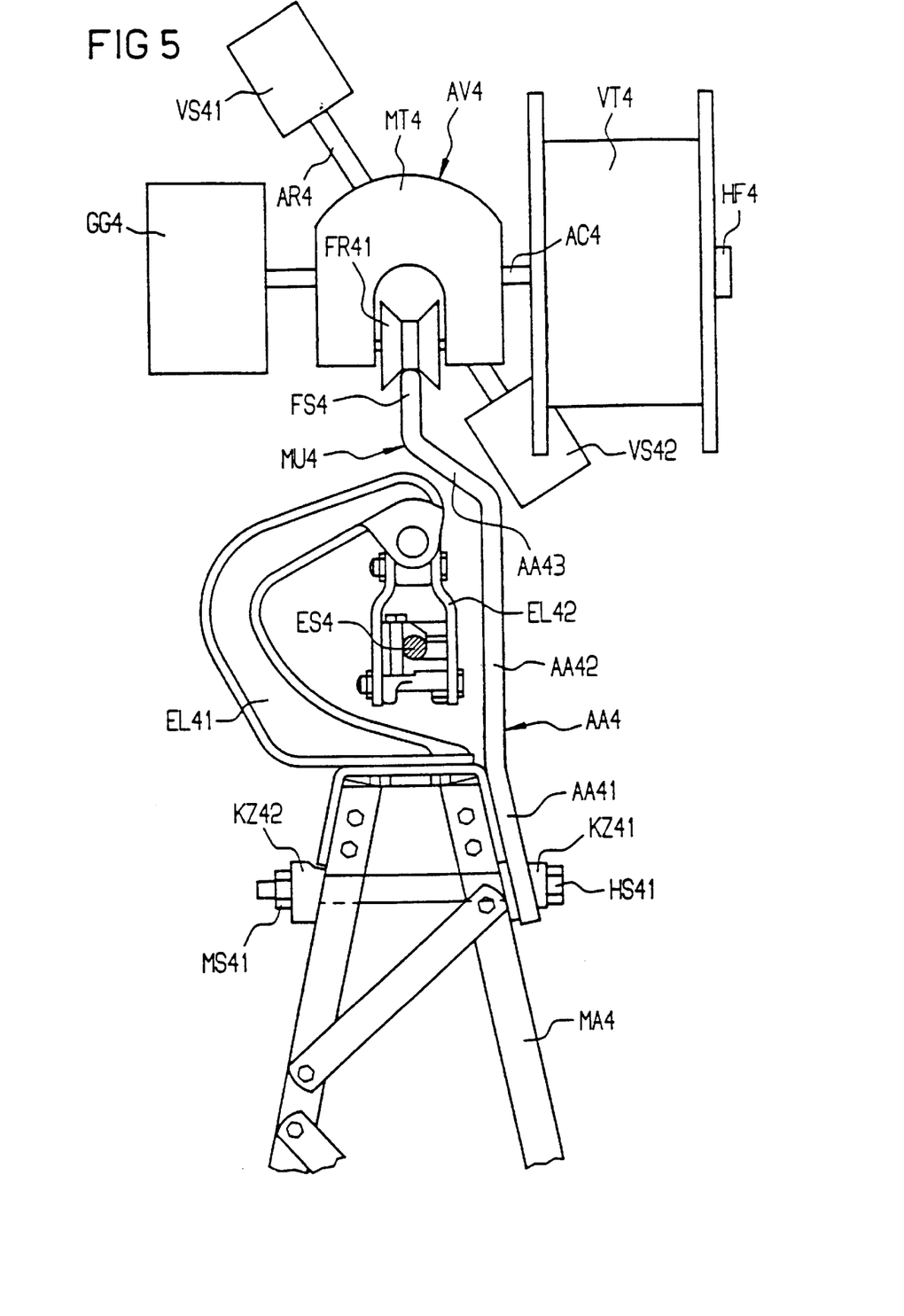
FIG. 5 is an end view of the pylon bypass according to FIG. 4, seen essentially in the longitudinal direction of the cable.

In FIGS. 4 and 5, a ground cable ES4 is arranged in the upper region of a pylon MA4 which, in this case, is designed as a lattice pylon. As can be seen from FIG. 5, this ground cable ES4 is fastened to the upper pylon end by means of a metallic retaining element EL41, and the ground cable ES4 is supported in a moving suspension device EL42. Furthermore damping elements DG41 and DG42 (FIG. 4) are fitted to the ground cable ES4 and are intended to keep mechanical oscillations away as far as possible from the lug EL42, which is used for clamping the cable ES4. Since the damping elements DG41 and DG42 and, in particular, the retaining elements EL41 and EL42 for the ground cable ES4 are in the way of continued movement of the lashing apparatus AV4 for the optical cable OC4, a pylon bypass MU4 is provided which carries the lashing apparatus AV4 on a path which runs essentially approximately vertically above the ground cable ES4. This pylon bypass MU4 is fastened to the ground cable ES4 via the retaining ends EC41 and EC42, in particular in the form of latching, snap-action, clamping or other mechanical connecting devices. The guide rail FS4, which represents the bridging part, initially runs approximately tangentially to the ground cable ES4 and then swings upward in an arc which reaches its maximum height roughly in the region of the pylon axis in order then to open, likewise in the form of an arc and running out slowly, into the right-hand end retaining element EC42. The lashing apparatus AV4 contains at least two guide wheels FR41 and FR42 which are recessed in the form of grooves and are mounted in a center part MT4 of the lashing apparatus in such a manner that they can rotate. The center part MT4 also advantageously is able to contain a drive device, for example a motor. The lashing apparatus AV4 furthermore contains a supply drum VT4, which is fitted at the side, for holding the optical cable OC4, and this drum is being mounted such that it can rotate via a retaining flange HF4 on a shaft AC4 which is attached to the center part MT4. In order to keep the running axis of the supply drum VT4 horizontal, a counterweight GG4 is arranged on the opposite side of the center part MT4. Furthermore, two supply coils VS41 and VS42 are provided on an arm AR4 which is mounted on the center part MT4 such that it can rotate, and these supply coils VS41 and VS42 contain lashing material (not illustrated in more detail here) in the form of straps or thread and apply this material continuously, for example in the form of a helix, onto the ground cable ES4 and the optical cable by rotation during the normal lashing process. The end of such a lashing strap is indicated in the left-hand part of FIG. 4, and is denoted by AL4.

The actual lashing process is interrupted in the pylon region, with the optical cable OC4 no longer being lashed and guided appropriately by the lashing apparatus AV4, and the laying operation having to be carried out by the technician in a process independent of this. In particular, it is necessary to bridge the damping elements DG41 and DG42 as well as the retaining element EL42 for the ground cable ES4.

The guide rail FS4, on which the guide wheels FR41 and FR42 run and thus move the overall lashing apparatus AV4 forward, is held on the pylon MA4 by means of a supporting device in the form of an arm AA4 running roughly vertically. Metal in the form of a profile or a strip, in particular strip iron or strip aluminum, is preferably used to form the arm AA4 and is dimensioned such that it is strong enough to be able to bear the load formed by the lashing apparatus AV4. At the same time, some of the load is also transmitted to the ground cable ES4 through the retaining elements EC41 and EC42 of the ends, so that the supporting arm AA4 need not be dimensioned to be excessively heavy. The arm AA4 comprises a lower partial arm AA41 which is preferably provided with a transverse bracket AA4Q and is fastened to the pylon MA4 for example via retaining screws ES41 and HS42 (FIG. 4). The associated locknut, as can be seen in FIG. 5, has the reference symbol MS41. If the outer pylon contour runs in a correspondingly highly oblique manner, then intermediate layers KZ41 and KZ42 in the form of wedges must be provided in order to provide a vertical mounting surface for the head of the retaining screw HS41 and the locknut MS41. In general, it is unnecessary to pass the retaining screw HS41 through the entire pylon MA4 (as shown in FIG. 5). It is also possible for the arm AA4 to be fastened, for example, by screws, brackets, cramps, lugs or the like engaging around parts of the pylon, in particular by means of quick-action clamping devices, for example, clamping straps.

The arm part AA41 which rests on the pylon MA4 is followed by an arm part AA42 which runs essentially vertically, at the side of the ground cable ES4, and runs past its suspension EL42 and EL41. This arm part AA42 is adjacent to an obliquely running arm part AA43 which finally opens into the guide rail FS4 which here runs essentially vertically and in or on which the guide wheels run, of which only the guide wheel FR41 of the end can be seen in FIG. 5. The pylon bypass MU4, together with the guide rail FS4, must be arranged sufficiently far away from the fixed parts of the pylon that the lashing apparatus AV4 can be moved past the pylon without rubbing against the various fixed parts of the pylon.

After moving around the pylon NA4, the pylon bypass MU4 is detached from the ground cable ES4 by opening the retaining elements EC41 and EC42 at the ends and disassembling the associated supporting arm AA4 by undoing the retaining screws HS41 and HS42, whereupon, in the simplest case, the pylon bypass MU4 can be carried along by the lashing apparatus AV4, to be precise until the next pylon is reached. Then, the pylon bypass MU4 is attached to the ground cable ES4 once again in the manner already described, and the process of bypassing the pylon is carried out once again.

Figure 6:
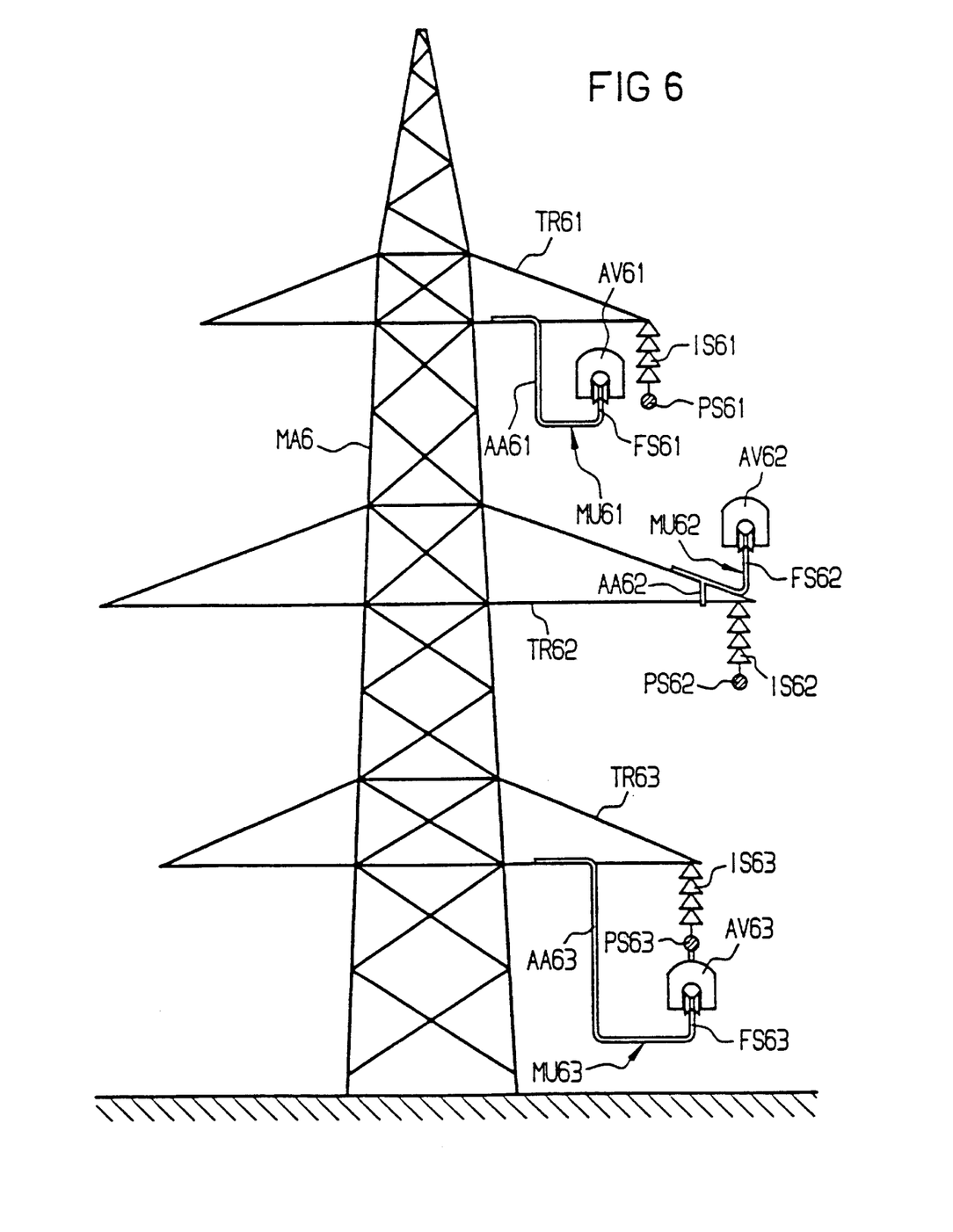
FIG. 6 is a view taken in the longitudinal direction of the cable of a high-tension pylon with cross arms and various refinements of pylon bypasses according to the invention.
Figure 7:
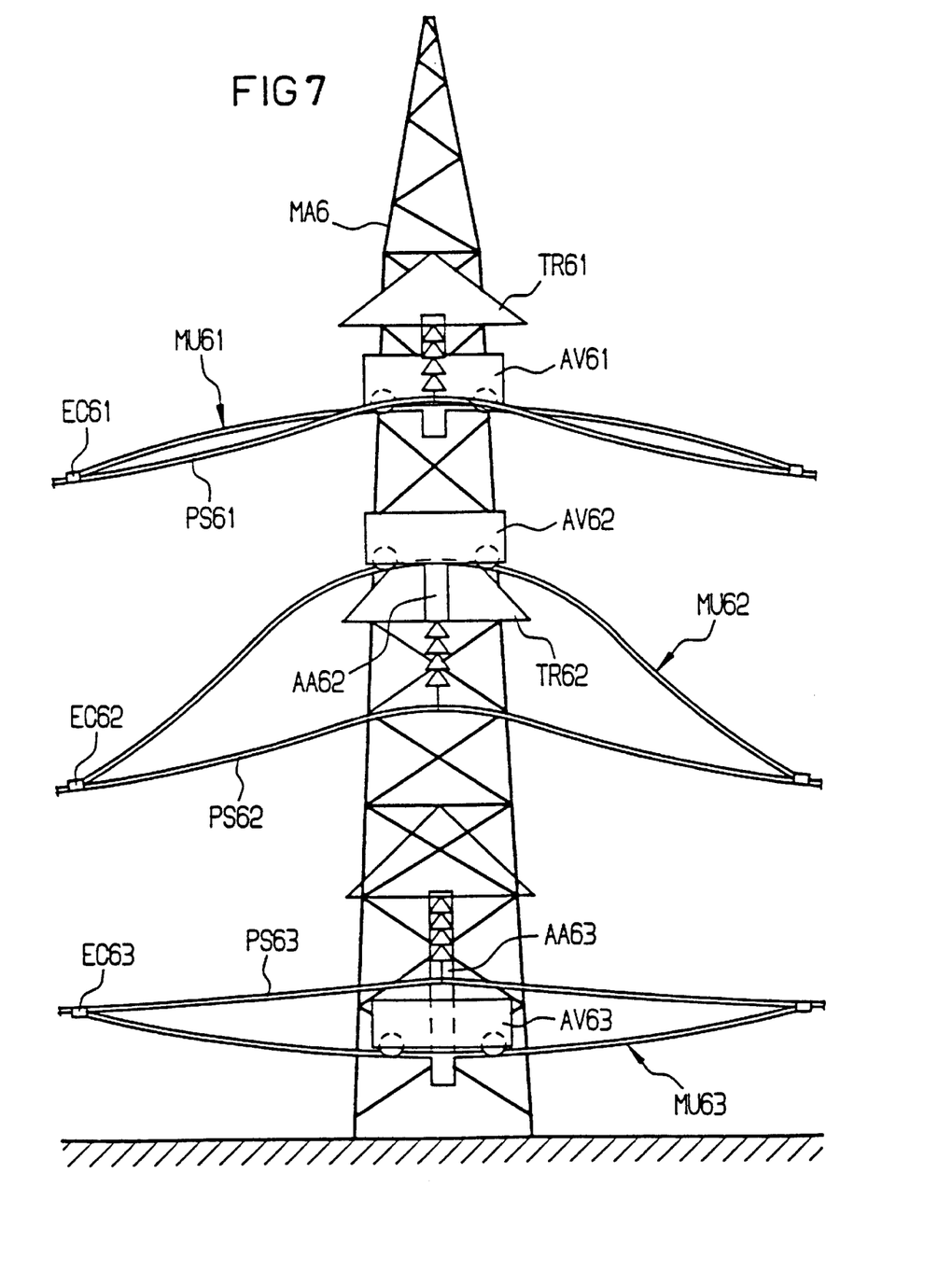
FIG. 7 is a side view of the high-tension pylons according to FIG. 6.

FIG. 6 and FIG. 7 illustrate a lattice pylon MA6 for a high-tension overhead line, and this lattice pylon MA6 is fitted with three cross arms TR61, TR62, TR63. Phase cables PS61, PS62, PS63 are respectively held via insulators IS61, IS62, IS63. The left-hand side of the pylon MA6 is fitted in an analogous manner, but in order to simplify the illustration, the corresponding phase cables have been omitted.

In the case of the cross arm TR61, the illustration indicates that a pylon bypass MU61 has been fitted on the inside on the cross arm TR61 between the insulator IS61 and the pylon MA6 and in a proximate horizontal plane of the phase cable PS61 so that the lashing apparatus AV61 is running in an at least approximately horizontal plane alongside the phase cable PS61. The upper part of the arm AA61 is fastened to the cross arm TR61, and is then bent downward and finally runs upward again, where it then bears the approximately vertically running or extending guide rail FS61.

In the case of the exemplary embodiment of a pylon bypass MU62 corresponding to the center cross arm TR62, the phase cable PS62 is bypassed in a plane running or extending approximately vertically, to be precise above the phase cable PS62. To this end, the pylon bypass MU62 is fastened by its arm AA62, which is used for support, on the top of the cross arm TR62, and the guide rail FS62 runs approximately vertically and bears the lashing apparatus AV62.

On the cross arm TR63, the phase cable PS63 is bypassed underneath. The upper part of the arm AA63, which is used for support, is fastened on the cross arm TR63, then has an element which runs approximately vertically downward, is then bent in the direction of the phase cable PS63 and, finally, bears the guide rail FS63 at its end.

As can be seen from FIG. 7, the individual pylon bypasses are respectively held at the ends in the manner already described on the respective phase cable PS61 to PS63 via corresponding retaining elements at the end, for example EC61 to EC63.

Figure 8:
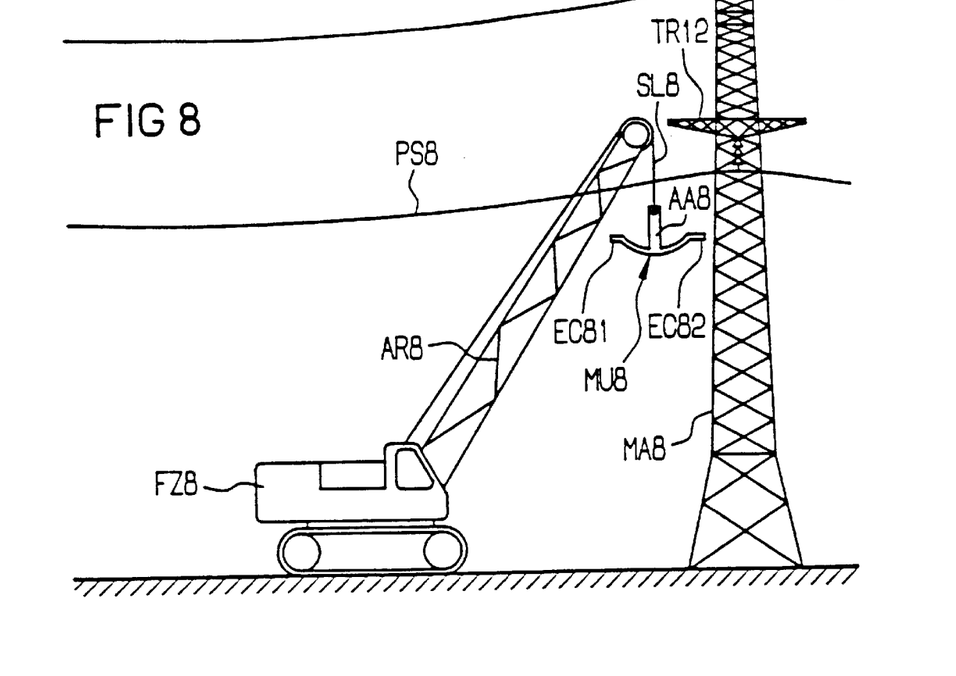
FIG. 8 is a view of a vehicle for passing pylon bypasses around pylons.

It is also possible, as illustrated in FIG. 8, to transport the pylon bypass MU8 by means of a vehicle FZ8 moving on the ground, and possibly a caterpillar-tracked vehicle or crane, to be precise, for example, by suspension on its cantilever arm AR8. The pylon bypass MU8 and its arm AA8 can be held there on a cable SL8 which can be moved upward and downward from the vehicle FZ8 in order to move the pylon bypass to the desired height and position. Once the retaining elements at the end have been fastened to the respective cable PS8, and once the supporting arm AA8 has been fastened to a fixed part of the pylon MA8, the supporting cable SL8 is loosened or unlatched. Once the lashing apparatus, which is not illustrated here, has bypassed the pylon, and once the retaining elements EC81 and ECS2 at the ends have been released, the pylon bypass MUS is removed from the cable PS8 again by means of the cantilever arm ARS, and the vehicle FZ8 is driven onto the next pylon.

Figure 9:
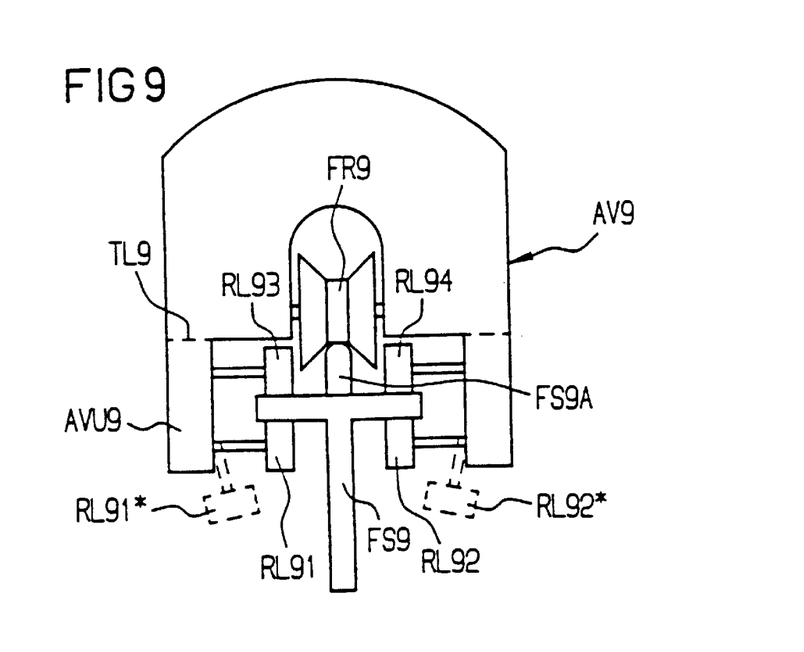
FIG. 9 is a detailed end view of a lashing apparatus in the region of the pylon bypass.

FIG. 9 shows how the guide rail FS9 can be designed in the form of a profile, in particular a cruciform or T-shaped profile, in a preferable manner in order to improve the mechanical robustness of the pylon bypass. It is also possible to refine the lashing apparatus AV9 such that it does not, or at least does not only, roll on the guide rail FS9 and its upward pointing attachment FS9A, but also engages around or underneath them, for example from underneath in addition, by means of rollers. To this end, in addition to the actual guide rollers, for example FR9, the lashing apparatus AV9 also has stability rollers RL91 and RL92 which engage around the guide rail FS9 and its transverse limb underneath and thus additionally secure the lashing apparatus AV9. The stabilization rollers LR91 and LR92 can be folded into the position RL91* and RL92* shown by dashed lines when the lashing apparatus AV9 is being moved.

Furthermore, it is also possible for a movable lower section AVU9 to be provided in the region of the pylon bypass, and advantageously connected to the bypass. The section AVU9 essentially contains only those parts underneath the dashed-dotted line TL9, which parts include the stabilization rollers RL91 and RL92 located underneath as well as supporting rollers RL93 and RL94 running above and on the guide rail FS9. Then, when bypassing the pylon, the actual lashing apparatus, which is the part of AV9 located above TL9 is just placed on this movable lower section AVU9, and is coupled to it. It is no longer necessary for the wheel FR9 to be connected to the guide rail FS9, because the wheel is connected to it only indirectly via the movable lower section. The attachment PS9A on the guide rails may thus be omitted, if required. The movable lower section AVU9 can expediently be connected in a captive manner to the pylon bypass so that, during movement processes, it is always likewise reliably moved to the new point of use.

In some cases, particularly when pylons follow one another very closely, and under some circumstances, it is too inconvenient to fasten pylon bypasses to the cables. In these and similar cases, a configuration corresponding to FIG. 10 may be used, in which a complete lashing apparatus AV10 together with the associated supply drum VT10 for the optical cable to be lashed on the line or cable is fastened to a cantilever arm AR10 of a vehicle FZ10. In this case, the vehicle FZ10 is designed as a vehicle on tracks, that is to say rails GL10 and GL10A are provided, on which wheels RG10 and RG10A run. The track body with the rails GL10 and GL10A may be designed, for example, as a field track for the purpose of lashing on the cable on its own.

Figure 10:
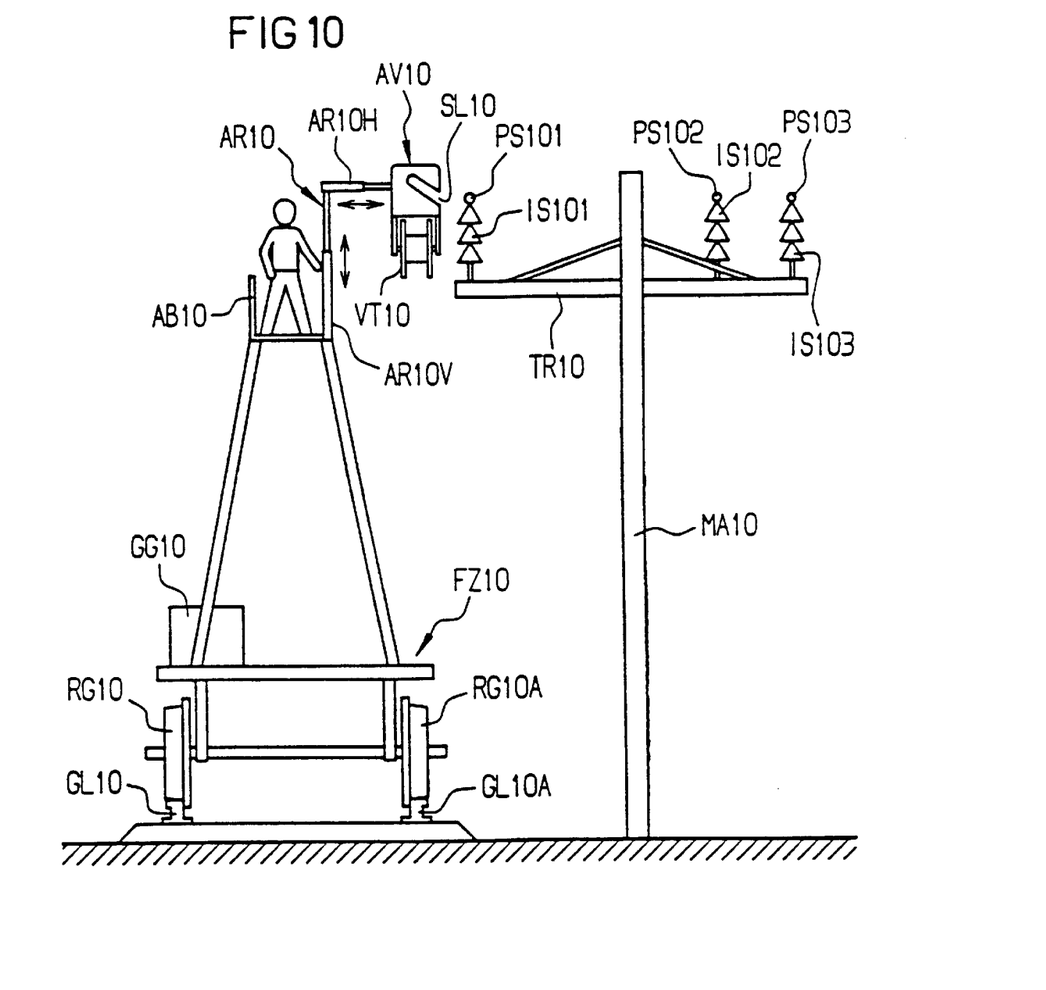
FIGS. 10 and 11 are schematic views of two embodiments of vehicles for passing a lashing apparatus around a pylon.

A cross arm TR10 is provided on the pylon MA10, on which cross arm TR10 three insulators, in particular support insulators IS101, IS102 and IS103 are provided in the case of a medium-tension overhead line (for example 15 kV), and are respectively fitted with phase cables PS101, PS102, PS103 at their upper end. In the present example, it is assumed that the intention is to lash an optical cable to the phase cable PS101. To this end, a working platform AB10 is mounted on the vehicle FZ10 and carries the lashing apparatus AV10 via a cantilever arm AR10. The cantilever arm AR10 expediently has a horizontally running cantilever arm AR10 and a vertical arm AR10V, which are advantageously designed as telescopic arms, so that their elevation and azimuth are variable. The interaction of the two arms AR10A and AR10V thus allows the lashing apparatus AV10 to be moved to any desired heights and distance position. As is indicated schematically, an obliquely running slot SL10 is indicated on the lashing apparatus AV10, by means of which the associated phase cable, for example PS101, can be moved into the interior of the lashing apparatus AV10, preferably into an approximately central position. The actual lashing process can then start in this position, wherein the cable is unwound from the supply drum VT10 and is fastened to the respective cable PS101 by appropriate lashing means. In the illustrated position, the arrangement operates as a pylon bypass.

The supply drum VT10 for the optical cable is fitted underneath the actual lashing apparatus AV10 in order to save as much space as possible at the sides. The stability of the structure in the vehicle FZ10 can be improved by arranging the working platform AB10 together with the cantilever arm AR10 and the lashing apparatus AV10 such that the center of gravity of this overall arrangement ends up approximately in the center of the vehicle FZ10, that is to say, in the figure, these parts would have to be moved further to the left. Alternatively, it is possible to ensure stability by means of an appropriately arranged counterweight GG10.

The illustrated arrangement can also be used in order to form a guide for the lashing apparatus AV10 between the pylons, as well. This means that, throughout the entire lashing process, the lashing apparatus AV10 does not run on, or at least runs only partially on to the respective cable, for example PS101 and is essentially borne by the arm AR10. This is particularly expedient when the cables, for example PS101, are themselves too weak to bear the entire weight of the lashing apparatus AV10 together with that of the supply drum VT10 for the optical cable. This type of continuous mechanical mounting of the lashing apparatus AV10 by means of a vehicle FZ10 may also be advantageous when the pylon structures are not sufficiently strong to be able to reliably absorb the loads produced by the lashing apparatus AV10.

It is also possible to use the arrangement according to FIG. 10 when the pylon MA10 is part of a railway overhead line. In this case, the traction wire (not illustrated here) would be fitted underneath the cross arm TR10, while, as the supply conductor, the conductor PS101 is used for the power supply for the actual traction wire.

Figure 11:
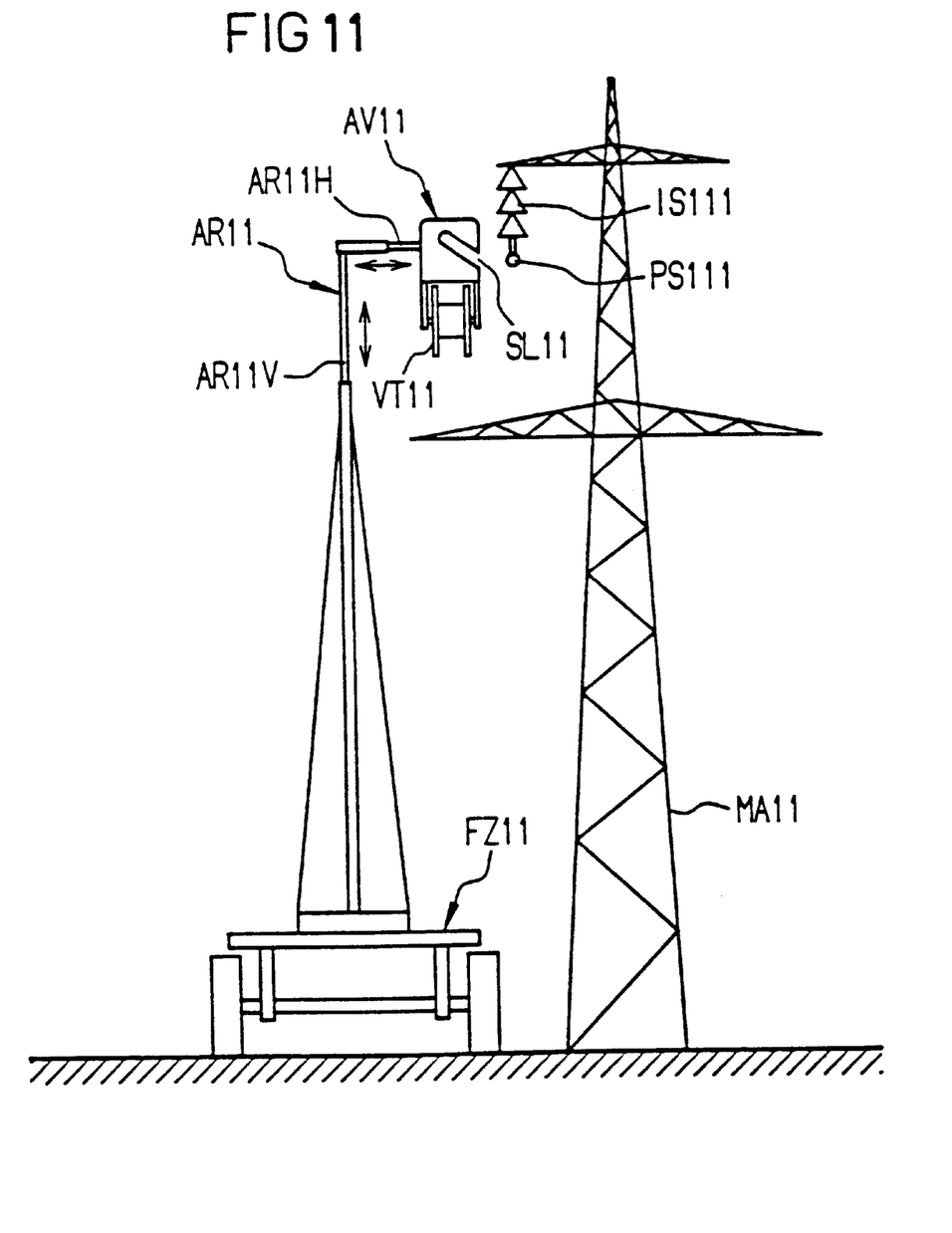

FIG. 11 illustrates a vehicle FZ11 which can move freely on the ground, and it is not on tracks, and which is used to lash an optical cable to a high-tension overhead line, which has one pylon of this overhead line being illustrated, and being denoted by MA11. The vehicle FZ11, in particular a caterpillar-track vehicle, has a structure AR11 which contains a vertical, variable height arm AR11V, which is designed in particular as a telescopic arm, and a horizontally running, likewise variable length arm AR11H, which is preferably a telescopic arm. The lashing apparatus AV11 is fitted to this horizontally running arm AR11H, has a slot SL11 which engages around the associated cable, for example the phase cable PS111, in the operating position, when the apparatus AV11 is moved into the lashing position.

The vehicle FZ11 may be used as a bypassing device in the sense of a pylon bypass for the lashing apparatus AV11, that is to say, for example, in order to bypass the suspended insulator IS111 of a phase cable PS111. In this case, the load of the lashing apparatus AV11 together with that of the associated supply drum VT11 is essentially absorbed by the vehicle FZ11 only in the pylon region.

Alternatively, it is possible to carry out the entire lashing process by means of the vehicle FZ11 and not only, for example, the bypassing in the pylon region. In this case, the lashing apparatus AV11 remains held on the cantilever arm AR11H, and the vehicle FZ11 moves along the high-tension overhead line, and the lashing of the optical cable is carried out continuously by using appropriate fastening means. In this case, it may be expedient to match the height of the vertical arm AR11V continuously to the drop of the cable PS111, in particular by means of appropriate sensors which control guidance for the lashing apparatus AV11 (by continuously varying the height of the vertical arm AR11V) continuously in accordance with the specified catenary of the phase cable PS111. During the lashing process itself, the cable PS111 is expediently not loaded by the entire load of the lashing apparatus AV11 and of the supply drum VT11 for the optical cable, but only by a part of this weight.

Figure 12:
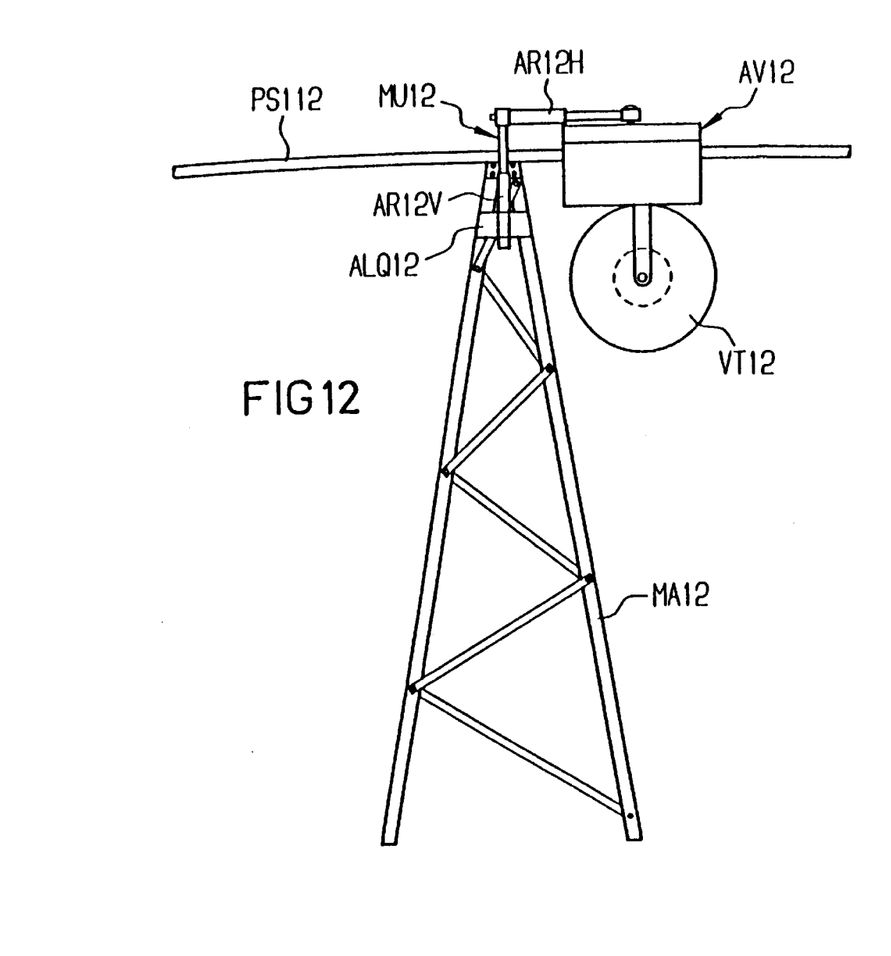
FIGS. 12 to 14 are views of a further exemplary embodiment of a pylon bypass with FIG. 12 being a side view, FIG. 13 being an end view and FIG. 14 being a plan view.
Figure 14:
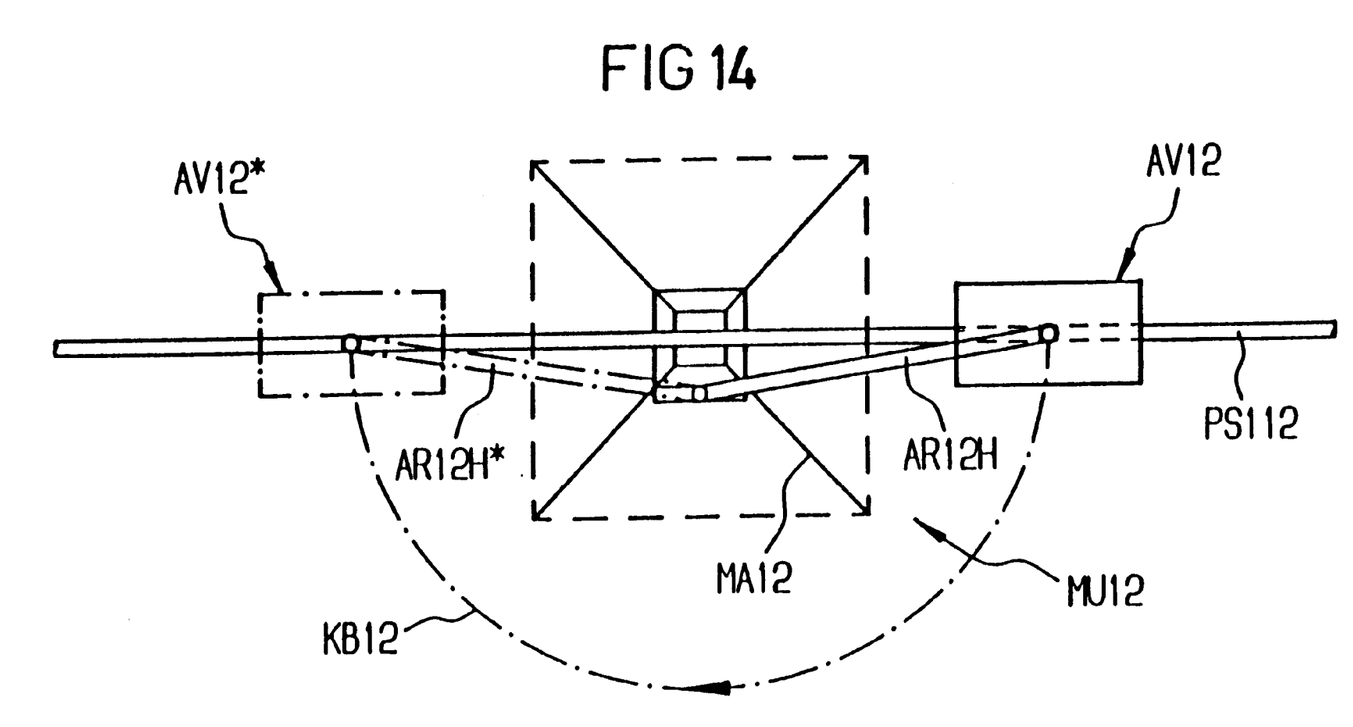

FIG. 12 illustrates a pylon MA12 seen transversely with respect to the longitudinal direction of a cable PS112 the lashing apparatus AV12 running on a cable PS112 (in this case, configured as a ground cable). FIG. 14 shows a plan view of this pylon MA12, and it can be seen that the lashing apparatus AV12 has moved along the cable PS112 coming from the right, and has lashed on the optical cable, which is not illustrated in any more detail. A bypassing process is now necessary, for which purpose the lashing apparatus AV12 is fastened to a pylon bypass MU12, which is held on the pylon MA12 via appropriate fastening means for example, screws or quick-release clamping fasteners ALQ12. The pylon bypass MU12 essentially comprises an approximately vertically extending arm part AR12V and an essentially approximately horizontally extending arm part AR12H. The lashing apparatus AV12 is held at the and of this horizontally extending arm part AR12H via an eye or the like when it is intended to carry out a bypassing process around a pylon. The arm AR12V is mounted such that it can rotate about an essentially vertically extending axis, and its height is preferably adjustable by the arm being designed as a telescopic arm. When the vertical arm AR12V is mounted such that it can rotate, the arm AR12H is rigidly connected to it and is likewise designed to have a variable length extent which arm is also preferably designed as a telescopic arm. If on the other hand, the vertical arm AR12V is fixed and is not designed such that it can rotate, then the horizontal cantilever arm AR12H must be mounted such that it can rotate on the fixed arm AR12V, for example by means of an appropriate rotating joint or the like.

On reaching the pylon region, as is indicated in FIG. 14, the pylon bypass MU12 is mechanically connected by means of its arm AR12H to the lashing apparatus AV12, and the latter is moved on a circular arc XB12 around the pylon MA12 into a position AV12*, in which position it is once again moved into engagement with the cable PS112 and its lashing process can continue by longitudinal movement along the cable PS112. To this end, the arm AR12H has carried out a pivoting movement of somewhat more than 180°.

Figure 13:
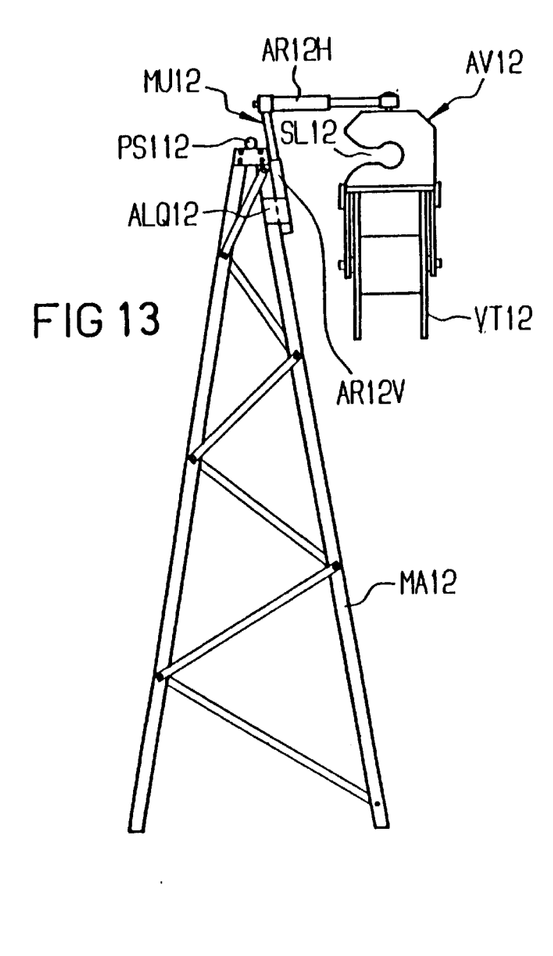

FIG. 13 shows the position of the lashing apparatus AV12, as seen in the cable longitudinal direction, after passing through a circular arc KB12 of about 90°. In this partial region, the lashing apparatus AV12 is, of course, no longer connected to the cable PS112 since, at the start of the bypassing process, this had been moved away from the cable via the slot SL12. The lashing apparatus AV12 is thus held, together with the supply drum VT12, by the arm AR12H at a correspondingly sufficiently great distance from the pylon MA12 and in this case does not engage either with the pylon or with a cable.

The retaining apparatuses for the cable PS112 have been omitted from FIGS. 12 and 13 in order to simplify the illustration and they may be fitted to corresponding cross arms, if required via insulators, which are likewise not illustrated here. Alternatively, it is possible for the cable PS112 to represent a ground cable which is fastened to the upper end of the pylon MA12, as is indicated in FIGS. 12 to 14.

We claim:

1. A method for fitting an optical cable to a suspended cable of an overhead line having a sequence of line pylons, said method comprising moving a lashing apparatus along the suspended cable of the overhead line to lash the optical cable to the suspended cable of the overhead line and bypassing the lashing apparatus around the pylon by attaching two ends of a pylon bypass, which is formed in the shape of an arc, to the suspended cable on opposite sides of the pylon, diverting the lashing apparatus from the suspended cable in the region of the pylon onto the pylon bypass so that the lashing apparatus moves in the path of an arc around the pylon.

2. A method according to claim 1, further comprising bypassing successive pylons as the lashing apparatus moves along the suspended cable during the lashing process by continuously fitting pylon bypasses to successive pylons.

3. A method according to claim 1, wherein the lashing apparatus, after bypassing the pylon, again continuously repeats the lashing process on the suspended cable.

4. A method according to claim 1, wherein the step of attaching the pylon bypass includes supporting the bypass on the pylon.

5. A method according to claim 1, which includes attaching the pylon bypass to the pylon by means of easily detachable fastening devices.

6. A method according to claim 5, wherein the detachable fastening devices are strap fasteners.

7. A method according to claim 6, which includes tightening the strap fasteners by turn buckles.

8. A method according to claim 1, wherein the pylon bypass has an arc of a segment of a circle.

9. A method according to claim 1, wherein the pylon bypass provides a guide rail, and said step of diverting comprises engaging running elements of the lashing apparatus with the guide rail.

10. A method according to claim 1, wherein the step of diverting comprises moving the lashing apparatus in a path above the suspended cable.

11. A method according to claim 1, wherein the step of diverting comprises moving the lashing apparatus in a path underneath the suspended cable and insulator.

12. A method according to claim 1, wherein the step of attaching the pylon bypass includes supporting the bypass essentially vertically above the cable.

13. A method according to claim 1, wherein the step of attaching the pylon bypass provides a plurality of sub-elements and includes assembling the sub-elements to form a complete pylon bypass.

14. A method according to claim 1, which includes transporting a pylon bypass from one pylon to the next pylon by the lashing apparatus.

15. A method according to claim 1, which includes transporting the pylon bypass from one pylon to the next pylon by means of a separate vehicle.

16. A method according to claim 1, which includes moving the lashing apparatus by means of a vehicle, and includes varying the vertical and horizontal position of the apparatus.

17. A method according to claim 16, which includes partially supporting the lashing apparatus by the vehicle during the lashing process.

18. A device for bypassing a lashing apparatus for an optical cable around a pylon, which apparatus is passed along a suspended cable of an overhead line, said device comprising a pylon bypass formed in the shape of an arc and having two ends resting on the suspended cable on opposite sides of the pylon, said pylon bypass having a guide for passing the lashing apparatus around the pylon.

19. A device according to claim 18, wherein the guide for passing of the lashing apparatus is arranged at a selected position selected from a side of, above and below the suspended cable.

20. A device according to claim 18, wherein the lashing apparatus can be moved by means of a vehicle which supports the lashing apparatus in variable vertical and horizontal positions.

* * * * *